United States Patent [19]

Rubin et al.

[11] Patent Number: 4,792,418
[45] Date of Patent: Dec. 20, 1988

[54] METHOD OF EXTRACTION AND PURIFICATION OF POLYUNSATURATED FATTY ACIDS FROM NATURAL SOURCES

[75] Inventors: David Rubin; Elyiahu J. Rubin, both of San Diego, Calif.

[73] Assignee: Century Laboratories, Inc., Port Washington, N.Y.

[21] Appl. No.: 810,550

[22] Filed: Dec. 19, 1985

Related U.S. Application Data

[63] Continuation-in-part of Ser. No. 765,498, Aug. 14, 1985, abandoned.

[51] Int. Cl.$^4$ ............................. C09F 5/00; C09F 5/10
[52] U.S. Cl. .................................... 260/412; 260/420; 260/428.5; 435/134
[58] Field of Search ...................... 260/412, 420, 428.5; 435/134

[56] References Cited

U.S. PATENT DOCUMENTS

4,377,526   3/1983   Fujita et al. ...................... 260/428.5

FOREIGN PATENT DOCUMENTS

| 115736 | 9/1982 | Japan . |
| 973128 | 11/1982 | U.S.S.R. . |
| 2033745 | 5/1980 | United Kingdom . |
| 1604554 | 12/1981 | United Kingdom . |
| 2148713 | 6/1985 | United Kingdom . |

OTHER PUBLICATIONS

Markley, *Fatty Acids–Their Chemistry, Properties, Production and Uses*, Part III, 1964, pp. 2309–2358, and newly cited pp. 2081–2104.

Teshima, S. et al., "Separation of Polyunsaturated Fatty Acids by Column Chromatography on a Silver Nitrate-Impregnated Silica Gel", *Bull. of Jap. Soc. of Sci. Fisheries*, 44(8) 927 (1978).

Abu-Nasr, A. N. et al., *J. Am. Oil Chemists Soc.*, 31, 41–45 (1954).

Swern, D. "Techniques of Separation: E. Urea Complexes", *Fatty Acids: Their Chemistry, Properties, Production and Uses*, edited by Klare S. Marklay, part 3, pp. 2309–2358, Interscience Publishers, N.Y., 1964.

Markley, K. S., "Techniques of Separation: A. Distillation, Salt Solubility, Low Temperature Crystallization", *Fatty Acids*, part 3, pp. 2081–2123, Interscience Publishers, (1964).

Privett, O. S. et al., *J. Am. Oil Chemist. Soc.*, 36, 443–449 (1959).

Swern, D. et al., *J. Am. Oil Chemist. Soc.*, 29, 431–434, 614–615 (1952).

*Primary Examiner*—Charles F. Warren
*Assistant Examiner*—Elizabeth A. Hanley
*Attorney, Agent, or Firm*—Browdy & Neimark

[57] ABSTRACT

To extract and purify of polyunsaturated fatty acids, particularly EPA and DHA, without cis-trans conversion, from naturally occurring oils, such as marine animal oil and various vegetable oils a mixture of free fatty acids is first extracted from the oil. The resulting mixture of pure fatty acids is then subjected to separation by means of urea complexing to remove saturated fatty acids and most mono-unsaturated fatty acids. Remaining solvent and urea are then removed from the filtrate which is then subjected to low temperature fractional crystallization in the presence of an organic solvent such as acetone. Substantially pure polyunsaturated fatty acids, especially EPA and DHA, can be separately precipitated by reducing the temperature of the filtrate in two steps. Alternatively, the volume of the filtrate is reduced in two steps and cooled to form precipitates, which are removed. The final product is a mixture of substantially pure DHA and EPA.

33 Claims, No Drawings

METHOD OF EXTRACTION AND PURIFICATION OF POLYUNSATURATED FATTY ACIDS FROM NATURAL SOURCES

CROSS-REFERENCE TO RELATED APPLICATIONS

This is a continuation-in-part of Ser. No. 765,498 filed Aug. 14, 1985, now abandoned, the entire contents of which are hereby incorporated by reference.

FIELD OF THE INVENTION

The present invention relates to a method for separating polyunsaturated fatty acids from natural sources of these acids, particularly to a method for separating substantially pure EPA and DHA from natural sources of these oils, such as marine animal oils, and to such a method which uses only materials which are generally recognized as safe, and only mild reaction conditions so that the obtained products are substantially 100% pure without cis-trans conversion and can be used in foods and pharmaceuticals.

BACKGROUND OF THE INVENTION

Various fats and fatty oils comprise triglycerides of fatty acids. Many fatty acids, particularly polyunsaturated fatty acids, are difficult to synthesize and can only be obtained by extraction from natural fats or fatty oils in which they naturally occur. Many of these unsaturated fatty acids are known to have therapeutic potential. Others are thought to have undesirable effects. Furthermore, the fatty acids having therapeutic properties must be in a particular cis-trans isomeric form. Processes for obtaining such unsaturated fatty acids in pure form and high quantity, without cis-trans conversion, have been long sought.

Two particular polyunsaturated fatty acids which have been shown to have therapeutic efficacy, and which are difficult to obtain in pure form and high quantities, are (all-Z)5,8,11,14,17-eicosapentaenoic acid, hereinafter referred to as EPA, and (all-Z)-4,7,10,13,16,19-docosahexaenoic acid, hereinafter referred to as DHA. Both EPA and DHA are known to be precursors in the biosynthesis of prostaglandin $PGE_3$.

British Pat. Nos. 1,604,554 and 2,033,745 disclose thrombo-embolic conditions. British patent publication No. 2,148,713, to the present inventor, also discloses the use of EPA and/or DHA, in combination with other specific fatty acids, for reduction of serum cholesterol and triglyceride levels.

It has heretofore been very difficult to obtain pure EPA and DHA since the main source of these fatty acids is the fats and oils of marine animals, such as the mackerel, sardine or cod, and vegetable oils, such as linseed oil, either as itself or in the form of a derivative, such as a triglyceride. Unfortunately, other fatty acids are always present in larger amounts. Since EPA and DHA are known to have medical effectiveness, highly pure EPA and DHA are required in large amounts in order to conduct clinical studies.

Previous methods for extraction of EPA, DHA and other useful polyunsaturated fatty acids from their triglycerides, have not been satisfactory for the production of highly pure fatty acids. The term "purity" is used here to mean not only in the sense of being separated from all other fatty acids of different chain lengths and different number and placement of unsaturations, but also purity of the particular cis-trans structure. Prior art methods not only did not yield sufficient purity, but in many cases also required such extreme physical and chemical conditions as to cause some degree of degradation of the fatty acids, formation of peroxides, and/or conversion of at least some of the cis- bonds to the trans-form. Furthermore, many prior art processes use materials which are not on the Generally Recognized As Safe (GRAS) list of the U.S. Food and Drug Administration. In order for the final product to be used in foods and drugs it is important that there be no non-GRAS substances in the final product.

One prior art method of purifying EPA is disclosed in U.S. Pat. No. 4,377,526. In this patent, a mixture of fatty acids containing EPA is treated with urea in order to remove saturated fatty acids and fatty acids of lower unsaturation. The resultant solution is then subjected to fractional distillation in order to obtain higher yields of EPA. The fractional distillation, however, requires a temperature of at least 180° C. over a period of at least 40 minutes. The best purity which can be obtained by this method set forth in any of the examples of this patent is 92.9%. Furthermore, it has been discovered that a substantial amount of the EPA produced by this method, in some cases as high as 20%, has some degree of cis-trans conversion. Any amount of the trans- form of EPA is strictly undesirable for food or pharmaceutical use.

Abu-Nasr, A. N. et al, *J. Am. Oil Chemists Soc.* 31, 41–45 (1954) discloses isolation of methyl eicosapentaenoate and ethyl docosahexaenoate starting with cod liver oil acids, using preliminary concentration by precipitation of the pure complexes followed by chromatographic separations. This technique does not give high enough purity and chromatographic separations require undesirably high amounts of solvent.

Teshima, S. et al, Bulletin of the Japanese Society of Scientific Fisheries, 44 (8) 927 (1978) describe a method for isolation of EPA and DHA from squid liver oil by saponifying with ethanolic potassium hydroxide, extracting the fatty acids with ether and methylating. The crude fatty acid methyl ester is purified by column chromatography on Silica Gel 60 and then the EPA is separated from the DHA by column chromatography on a mixture of silver nitrate and silica gel. The problem with this technique is tha there are often traces of silver left in the final product which is extremely undesirable in a food or pharmaceutical for human consumption. Furthermore, very high amounts of solvent are necessary in order to conduct the column chromatography. Other disclosures of the use of column chromatography to separate and purify, to some extent, EPA are described in Japanese Kokai No. 56-115736 and Russian 973,128.

Another prior art method of obtaining high purity EPA is disclosed in British patent publication No. 2,148,713. This publication describes a process in which the double bonds of the unsaturated fatty acids, in a mixture of fatty acids, are iodinated, followed by saponification of the iodinated oil, extraction of the fatty acids from the saponification mixture, methylation of the iodinated fatty acids, separation of the fatty acids by column chromatography, and then deiodination of the desired fractions. This process permits excellent resolution of the fatty acids upon eventual column chromatography, and protects the fatty acids from oxidation during processing. When used to separate EPA from a natural source of EPA, such as cod liver oil, a yield of over 90% and a purity of 96-100% may be obtained. It has been found, however, that a substantial amount of cis-trans conversion occurs in the course of this process, so that the product obtained of a purity of 96-100% is not pure all cis- EPA. Furthermore, iodine is not on the list of GRAS materials.

Various techniques of separation have been used with respect to fatty acids in general. Among these known techniques are separation by means of urea complexes and separation by means of low temperature fractional crystallization.

The separation technique utilizing urea involves the formation of crystalline inclusion compounds, also called adducts or complexes, between urea and various straight chain organic compounds. Inclusion compounds are combinations of two or more compounds, one of which is contained within the crystalline framework of the other. The components of an inclusion compound are each capable of separate existence, and they have no obvious way of uniting chemically. They are held together by secondary valence forces and by hydrogen bonds. Inclusion compounds differ from the conventional hydrogen-bonded systems, however, because the size and shape of the "host" and "guest" molecules are critically important in the former but may play little or no part in the latter.

It is known that the more saturated a long chain fatty acid, the more readily is a urea complex formed. Thus, saturated and most mono-unsatuated compounds may be separated from polyunsaturated compounds by treatment with urea. The techniques of separation by urea complexes are described in great detail in Swern, D. "Techniques of Separation: E. Urea Complexes" in *Fatty Acids: Their Chemistry, Properties, Production and Uses*, edited by Klare S. Markley, Part 3, pages 2309-2358, Interscience Publishers, New York, 1964, the entire contents of these pages being hereby incorporated by reference.

Low temperature fractional distillation has been used for separation of fatty acids and monoesters, and also for the separation of glycerides of natural fats and other lipid substances. The technique involves dissolving the fatty acids in a solvent and then lowering the temperature in order to cause crystallization of the various fatty acids from the solvent. Often sub-zero (°C.) temperatures are used. This technique has many limitations, however. It is difficult to obtain great degrees of purity when separating mixtures of many fatty acids, and there are problems of mutual solubility of various acids. The techniques and limitations of low temperature crystallization are described in detail in Markley, K. S., "Techniques of Separation: A. Distillation, Salt Solubility, Low-Temperature Crystallization" at pages 2081-2123 of the above cited Markley text, the entire contents of which are hereby incorporated herein by reference.

Privett, O. S. et al, *J.Am. Oil Chemist. Soc.*, 36, 443-449 (1959), describe a technique involving a combination of low temperature crystallization and urea complexes. In the analysis of pork liver lipids, low temperature fractionation was first used to obtain two fractions and the filtrate was subjected to fractionation from methanol via the urea inclusion compounds. Each fraction and the filtrate was esterified and distilled, and the various distillates subjected to analysis. Swern, D. et al, *J. Am. Oil Chemist. Soc.*, 29, 614-615 (1952) disclose precipitating urea complexes from olive oil to remove saturated and mono-unsaturated compounds and then subjecting the acids or esters isolated from the urea complexes to low temperature crystallization and to fractional dittillation in order to produce oleic acid at 97-99% purity. Swern, D. et al, *J.Am. Oil Chemist. Soc.*, 29, 431-434 (1952) and U.S. Pat. No. 2,838,480 isolate oleic acid from tallow, grease or red oil in 80-95% purity by first separating saturated acids by crystallization from 90% methanol at 0° C., followed by addition of urea to the filrate to precipitate the adduct of oleic acid at room temperature.

None of the prior art techniques, however, suggests a method for separating EPA and DHA from marine animal oil in substantially 100% purity, without cis-trans conversion, using only materials generally recognized as safe and capable of being used in an industrial process. Methods for separating other specific polyunsaturated fatty acids from natural sources in very high purity are also long-sought in the prior art.

SUMMARY OF THE INVENTION

Accordingly, it is an object of the present invention to solve the problems of the prior art.

It is a further object of the present invention to provide a method for the separation and purification of desirable polyunsaturated fatty acids, such as EPA and DHA and their esters, without degradation thereof.

It is another object of the present invention to provide a method for extracting a mixture of EPA and DHA, or other desirable polyunsaturated fatty acids, from marine animal oil, or other natural sources, in high yield and purity without degradation or cis-trans conversion, at temperatures which can readily be obtained in a commercial environment.

These and other objects are obtained in accordance with the present invention by first hydrolyzing the triglycerides of the oil source under mild conditions, such as by the use of the enzyme lipase, removing non-saponifiable material by washing with organic solvent, treating with urea in order to remove saturated and mono-unsaturated fatty acids to form a urea complex with saturated and mono-saturated fatty acids, dissolving the remainder in an organic solvent, preferably acetone, slowly cooling and fractionally removing solidified material as it forms. In a preferred embodiment, the use of extremely low temperatures to complete the precipitation of the pure fatty acids can be avoided by increasing the concentration of fatty acid in the solution after the formation and removal of each precipitate by evaporating a proportion of the solvent and then repeating the cooling step. In this manner, substantially the same yield and purity can be obtained without the use of extremely low temperatures which would make a commercial process less desirable.

Furthermore, this technique also works well for the separation and purification of other polyunsaturated fatty acids from natural sources thereof, such as for the separation of cis-linoleic and alpha-linolenic acid from linseed oil.

DETAILED DESCRIPTION OF PREFERRED EMBODIMENTS

While the preferred embodiments of the present invention relate to the separation of substantially 100% pure EPA and DHA with substantially no cis-trans conversion, the process of the present invention is also applicable to the separation and purification of other highly unsaturated fatty acids from natural sources. While much of the discussion below is specifically directed toward the separation of pure EPA and DHA from marine animal oil, it should be understood that the same techniques can be used for the separation of other highly polyunsaturated fatty acids from other natural sources.

The essential features of the present invention are avoidance of any extreme conditions throughout the procedure and the combination of the urea treatment with low temperature fractional crystallization in order to unexpectedly produce substantially 100% pure EPA and DHA with substantially no cis-trans conversion.

The oil from which the EPA and DHA is separated by means of the present invention is preferably as fresh as possible so that the separation may occur before any substantial degradation of the fatty acids occurs. Natural fats or oils containing high levels of EPA and DHA suitable for use in the present invention include, for example, fats and oils of marine animals such as blue-colored fish, such as the mackerel, sardine, mackerel pike and herring; cod liver oil; and animal marine plankton, such as krill and the various shrimp-like copepods. It should be understood, however, that any source of EPA and DHA may be used in the present invention. Preferably, the source fish are obtained from as cold an environment as possible. The optimal enzymatic activity for the enzyme $\Delta^5$-desaturase, which catalyzes the conversion of eicosatetraenoic acid to EPA, occurs at 9° C. Thus, fish from cold environments are higher in EPA than warmer water fish.

Furthermore, even greater yields of EPA can be obtained if the fish are raised in a controlled environment. If the fish are fed a diet rich in $\alpha$-linolenic acid and maintained in salt water at 9° C., optimum amounts of EPA will be produced.

The natural fat or oil is subjected to saponification or alcoholysis in order to convert the triglycerides to free fatty acids or esters of fatty acids. The method selected, however, should be one in which high temperatures and strongly basic reagents are avoided as these can lead to peroxidation and cis-trans conversion. The preferred method of hydrolysis is enzymatic hydrolysis using the enzyme lipase using a temperature of 35°–40° C. and pH of 6–7. The lipase should be activated by traces of cysteine or ascorbic acid, as is conventional. Another advantage of the use of lipase for saponification is the fact that lipase enzyme, being stereospecific, will not cleave any trans-fatty acids, which may be produced in nature from the triglycerides. Thus, even if there is trans-EPA or DHA in the starting material, it will be removed with the non-saponified material and will not be present in the final product.

An alternative method of hydrolyzing the natural fats and oils is by partially hydrolyzing these fats and oils with lipase or a strong base. When lipase is used, hydrolysis for 1½ to 2 hours, rather the usual six hours, provides a richer source of EPA because the lipase preferentially removes the first and third branches of the treated triglyceride. It is known that in natural triglycerides the outside branches have more greatly saturated chains than the middle branch. Thus, limiting the amount of hydrolysis automatically removes a substantial amount of the more saturated acids.

Potassium hydroxide can also be used to partially hydrolyze the natural fats or oils. The source of oil is treated with potassium hydroxide for about 15-20 minutes to partially hydrolyze the triglycerides. As in the case with lipase, this partial hydrolysis yields a richer source of EPA from the triglyceride because the first and third branches of the triglyceride are preferentially attacked by the base.

After the partial hydrolysis, sulfuric acid or other strong mineral acid such as hydrochloric acid or nitric acid is added to the hydrolysis mixture to separate out the mixture of fatty acids. The mixture of fatty acids floats to the top, and the bottom, aqueous, phase is discarded.

This partial hydrolysis step is also useful in improving the separation of other polyunsaturates from their triglycerides, regardless of the source of the triglycerides.

Mixtures of free fatty acids can also be separated from their natural sources by a transesterification process. The fatty acid containing material (marine animal oil, linseed oil, soybean oil, etc.) is refluxed with dry ethanol or dry methanol and a trace amount of sodium metal. This forms the ethyl or methyl esters, respectively, of the free fatty acids, liberating them from the triglyceride molecules. This method involves substantially milder conditions than basic hydrolysis, and prevents darkening of the reaction mixture from harsh conditions. The esters can be converted to free fatty acids at any stage of the extraction procedure by standard hydrolysis techniques. For some purposes it may be desirable to use the esters directly without conversion. to the free acid form.

In the next step, the non-saponifiable materials, such as cholesterol, vitamins A and D and hydrocarbons, are removed by washing with an organic solvent. Any organic solvent, such as petroleum ether, methylene chloride, ethyl ether, etc., may be used for this purpose.

After removal of the organic phase, the aqueous phase is acidified. Any acid may be used for this acidification step, although pharmaceutically acceptable acids are preferred. This will cause the free fatty acids to separate into a separate organic phase. The aqueous phase is then discarded. The addition of a small amount of sodium chloride or other salt will enhance the separation.

The fatty acid mixture is next submitted to a urea treatment in order to remove saturated and monounsaturated fatty acids. In the urea treatment, urea is added to a polar organic solvent capable of readily dissolving both urea and the fatty acids therein. Examples of operable solvents include methanol, ethanol, isopropanol, petroleum ether, benzene, trichloroethylene, and methyl isobutyl ketone. Ethanol is preferred in order to avoid toxicity problems. The urea is dissolved in the solvent, if necessary with heating, to obtain a urea solution which normally contains from 10 to 20% of urea. The urea solution and the fatty acid mixture are mixed together. While the fatty acid mixture may be added to the urea solution, it is preferred that the fatty acid mixture first be diluted in additional organic solvent in order to provide some degree of protection for the fatty acids against the elevated temperature of the urea solution. The free fatty acids may be dissolved in petroleum ether or other polar solvents such as acetone, ethanol, or methanol. The amount of the urea solution is adjusted to be at least 0.5 parts by weight, preferably 1–4 parts, relative to each part by weight of the fatty acid mixture. The urea solution is mixed homogeneously with the fatty acid mixture.

The urea is then precipitated, preferably by cooling the urea-treated solution. At this time, saturated and non-saturated fatty acids in the fatty acid mixture will form a complex with the urea crystals and precipitate out. The cooling may be conducted by leaving the solution to stand for a long period of time, if desired. The solution may also be forcibly cooled, for example by use of a water bath. Good results will be obtained when the solution is cooled to a temperature of at most 50° C., preferably from 30°-40° C. To obtain an even better urea removal, the solution may be further cooled in a refrigerator to about −10° C.

The complex of urea with saturated and monounsaturated fatty acids is then filtered off or otherwise removed. The filtrate solution obtained is concentrated, for example in an evaporator, to remove the major portion of the solvent, and then any remaining urea is washed from the fatty acid mixture with 5% hydrochloric acid. The solvent may also be removed by water extractions using 10 parts of water to one part of solvent.

The remaining fatty acid mixture is a substantially pure combination of higher unsaturated fatty acids. It has been discovered that these individual fatty acids may be completely separated in a very simple and accurate method by first dissolving them in an organic solvent, such as acetone, and then gradually cooling until the desired fatty acid solidifies out of the solution. As the solution is gradually cooled, various fatty acids, depending on their individual solubility in the solvent, precipitate. As each of these fatty acids precipitates, it is removed from the solution. The various fatty acids have specific points at which they precipitate from solution, depending upon their concentration in the solution. For example, it has been discovered that DHA precipitates from a 10% acetone solution at about −38° to −40° C. EPA precipitates at about -60° C. Most other fatty acids precipitate at temperatures above −30° C.

The solution is cooled in a bath of frozen carbon dioxide (dry ice) in acetone. The precipitate which forms at −38° to −40° C. is removed by filtration through sintered glass or a Buchner funnel without substantially raising the temperature. Analysis of the obtained crystals show substantially pure DHA; NMR studies show no cis-trans conversion.

The substance precipitating at about −60° C. has been shown to be substantially 100% pure EPA with no cis-trans conversion.

In order to avoid the extremely low temperatures required to separate EPA and DHA separately, the volume of the supernatant can be reduced after each crystallization to reduce the solubility of the fatty acids, yielding a mixture of substantially pure DHA and EPA.

The following table, appearing in Kirk-Othmer, *Encyclopedia of Chemical Technology*, third edition, vol. 4, page 827 (1978), shows the difference in solubility of various fatty acids at different temperatures in acetone, toluene, and n-heptane.

| Fatty acid | Temperature °C. | Solubility, g/100 g solvent | | |
|---|---|---|---|---|
| | | Acetone | Toluene | n-Heptane |
| 16:0 | 10 | 1.60 | 1.41 | 0.30 |
| | 0 | 0.66 | 0.36 | 0.08 |
| | −10 | 0.27 | 0.086 | 0.02 |
| | −20 | 0.27 | 0.018 | 0.005 |
| 18:0 | 10 | 0.54 | 0.390 | 0.080 |
| | 0 | 0.11 | 0.080 | 0.018 |
| | −10 | 0.023 | 0.015 | 0.004 |
| | −20 | 0.005 | 0.003 | |
| 18:1 (9c) | −20 | 5.2 | | 2.25 |
| | −30 | 1.68 | 3.12 | 0.66 |
| | −40 | 0.53 | 0.06 | 0.19 |

-continued

| Fatty acid | Temperature °C. | Solubility, g/100 g solvent | | |
|---|---|---|---|---|
| | | Acetone | Toluene | n-Heptane |
| | −50 | 0.17 | 0.28 | 0.05 |
| 18:1 (9t) | −10 | | 0.86 | 0.19 |
| | −20 | 0.26 | 0.20 | 0.06 |
| | −30 | 0.092 | 0.056 | 0.019 |
| 18:2 (9c, 12c) | −50 | 4.10 | | 0.98 |
| | −60 | 1.20 | | 0.20 |
| | −70 | 0.35 | | 0.042 |

It can be seen from the above table that reduction of the temperature by 10% decreases the solubility of any fatty acid in any of the solvents by a factor of from about 3 to 7. Because of this solubility factor, it was discovered that the desired fatty acids could be extracted by reducing the volume of solvent, and thus increasing the concentration of the solution, by a factor of from about 2 to 9 (i.e., the volume is reduced to ½ to 1/9 the original volume), and then refrigerating to a temperature which is substantially higher than the temperatures which would have been required without reducing the volume of solvent.

This technique of reducing the solvent has many advantages, particularly the fact that the temperatures required can be reached by many commercial freezers, and the process does not require special techniques or equipment.

The solvent reduction method of low temperature fractional crystallization may be accomplished using the combination of higher unsaturated fatty acids which are obtained as a result of the urea treatment step discussed in detail above. The combination of higher unsaturated fatty acids obtained by the urea treatment step is dissolved in the same type of organic solvent as is used for the reducing temperature method; for example, it can be placed into a 10% solution of acetone or petroleum ether. When cooled overnight to about −20° C., any remaining saturated fatty acids and various fatty acids with a low degree of unsaturation solidify out of the solution. The precipitate is then removed and discarded. The solution is then reduced in volume and increased in concentration by evaporation or distillation of the solvent to a predetermined fraction of its original volume, for example, one third of its original volume. When the reduced volume solution is again cooled to about −20° C., new crystals of monounsaturated fatty acids appear which crystals are again filtered out. The filtrate may then again be reduced by a factor of about one half to one ninth of its original volume and again cooled overnight to −20° C. Di-unsaturated fatty acids will now solidify out of solution. These crystals may again be filtered out and discarded. If the temperature is not low enough for formation and precipitation of crystals of the di-unsaturated fatty acids, the fatty acids will form a separate liquid phase that can be removed by a separatory funnel.

To be sure that all undesired fatty acids have crystallized from the solution, the filtrate may be cooled further to −30° C. If no separate phase or crystals appear, then the purification is complete. The solvent may then be evaporated.

The remaining liquid consists of a substantially pure combination of EPA and DHA. If desired, these two components may be separated by cooling to −38° to −40° C. to precipitate the DHA. For most utilities, however, the combination of EPA and DHA is at least as good as each individual component, and so there is no necessity of separating the two.

The fact that such a high degree of purity may be obtained by the method of the present invention is highly unexpected, particularly in view of the fact that the fractional crystallization procedure is not operable without first using the urea treatment. If the entire fatty acid mixture obtained after hydrolysis and removal of organic solvent soluble non-saponifiable material is subjected to cooling, the mixture of fatty acids precipitates from solution as a mixture. It has unexpectedly been discovered that only when the saturated and monounsaturated fatty acids are first removed by the urea method, the differences in the precipitation points of EPA and DHA from one another and from the fatty acids having the nearest precipitation points becomes great enough that they do not precipitate as a mixture of fatty acids but as pure EPA or DHA. Because of the large number and diversity of fatty acids which are found in marine animal oils, and vegetable oils, it has been extremely difficult to separate pure EPA and DHA therefrom. This is illustrated by the various publications discussed in the background section above. Only by the specific combination of urea treatment followed by low temperature crystallization, in that order, is one able to achieve 100% pure EPA and DHA with no cis-trans conversion. This is not made obvious by general knowledge of prior art techniques.

While the present process has been described with respect to the use of acetone as the organic solvent from which the fatty acids are precipitated upon slow cooling or by cooling in conjunction with increasing the concentration of the solution, it should be understood that any other organic solvent can be used for this purpose as long as the relative precipitation points of EPA and DHA are far enough from one another and from the other fatty acids in the mixture that pure precipitate can be separated. It is believed that for most solvents the temperature of precipitation of the various fatty acids is independent of the particular solvent used, although it is dependent upon concentration of the fatty acid in the solvent. The precipitation points of DHA from 10% solution of acetone, methylene chloride, cyclohexane and petroleum ether are all about $-38°$ to $-40°$ C. Similarly, the precipitation points of EPA from 10% solution of acetone, cyclohexane and petroleum ether are all about $-60°$ C. to about $-30°$ C., depending upon the concentration of DHA in the solution. Whether any given solvent is operable or inoperable for this purpose can easily be determined by routine experimentation. It is known, for example, that toluene and heptane will be operable, but they are not preferred because they are relatively toxic. The best organic solvents would be those which are non-toxic and generally recognized as safe or which can be completely eliminated without substantial treatment. Examples of preferred solvents other than acetone are cyclohexane, petroleum ether and methylene chloride. Furthermore, it is necessary that the solvent remain in the liquid state throughout the range of temperatures of precipitation, depending upon the concentration of the solute, for example, to a temperature of at least $-70°$ C.

In conducting the volume reduction embodiment of the present invention, the precise temperatures to which the solutions are cooled, and the precise amounts of volume reduction will differ depending upon the particular fatty acids present in the combination. These parameters may be determined empirically by those skilled in the art without undue experimentation. The solution may be cooled to a temperature slightly below that at which precipitation begins, and maintained at that temperature until the precipitation is completed. A volume reduction step is then conducted. As a rule of thumb, a volume reduction to one third of the volume of the previous step may be conducted each time. It may be found, however, depending on the particular fatty acids in the combination, that this is too great a volume reduction if combinations of fatty acids precipitate together. On the other hand, it may be found that this is not a sufficient volume reduction as no precipitation occurs at the temperatures at which it is convenient to reduce the solution. Routine experimentation will show the amount of volume reduction which will cause precipitation of the next fraction at the desired temperature.

The present invention is illustrated by the following non-limitative examples:

EXAMPLE 1

500 cc of cod liver oil was stirred vigorously in 2 liters of distilled water. As emulsifier, 50 g of the sodium salt of EPA was added. The pH of 7 was maintained during the reaction using a phosphate buffer and ascorbic acid. 1 g of pork pancreatic lipase was added to the emulsion and the emulsion was kept at 40° C. with continuous stirring for 6 hours.

100 cc of petroleum ether was added to remove the non-saponifiable material such as cholesterol, vitamin D, vitamin A and other impurities. After thorough mixing, the petroleum ether phase separated from the aqueous phase and the petroleum ether phase was removed by means of a separating funnel.

The aqueous phase was acidified, using 5% solution of $H_2SO_4$ and 50 g of sodium chloride in order to cause salting out of the organic phase. The organic phase which separated from the aqueous phase contained the free acids and was separated by means of a separating funnel and dried with sodium sulfate, which was then removed by filtration. The organic phase, which was then removed by filtration. The organic phase, which was then approximately 450 cc and contained the free fatty acids, was then mixed with 200 cc of absolute ethanol. 800 g of urea were dissolved in 2 liters of absolute ethanol by continuous stirring and heating to 70° C. The solution of free fatty acids in ethanol was then mixed with the urea-alcohol solution. A complex between the urea and the saturated and mono-unsaturated fatty acids immediately forms and precipitates out. The liquid phase was decanted and the ethanol was removed with an evaporator and recovered for reuse. The urea remaining in the liquid phase was removed by washing with 5% aqueous hydrochloric acid solution and then washed with distilled water. The organic phase thus obtained was subjected to analysis by gas chromatography. The results of this analysis were as follows:

| Fatty Acid | % |
|---|---|
| 16:1 | 4.8 |
| 18:1 | 1.5 |
| 18:2 | 1.2 |
| 20:5 | 57 |
| 22:6 | 18 |
| 22:1 | 17.5 |

The organic phase was then dissolved in acetone to make an approximately 10% solution. The temperature of the solution was gradually reduced by placing the solution in a commercial freezer. The first precipitation occurred at about 0° to −2° C. The precipitate was removed by filtration and was found to be substantially pure 24:1 fatty acid. The next precipitation occurred at about −5° to −8° C. and was recoved by filtration. This precipitate was found to be a mixture of 17:1 and 16:1 fatty acids. The next precipitation occurred at about −12° C. and was found to be substantially 18:2 fatty acid.

The remaining solution was then placed in a dry ice-acetone bath in order to further cool. At −38° to −40° C. another precipitation occurred. This precipitate was removed without substantially raising the temperature by means of a Buchner funnel and was subjected to analysis by gas chromatography. The product was found to be 100% DHA. The gas chromatography apparatus used had an accuracy of 0.001% and showed no impurities. The sample was also analyzed by NMR which showed that no cis-trans conversion occurred. The product was 100% all-cis DHA. The NMR study showed no peak for the trans-configuration.

The temperature of the remaining solution was continued to be lowered. At approximately −60° C. another precipitate occurred. Upon separation in the same manner as described above for DHA, the precipitate was shown to be 100% pure EDA. NMR studies showed no trans-configuration whatsoever.

The yield of EPA was approximately 15% of the starting cod liver oil, and the yield of DHA was approximately 9% of the original cod liver oil.

EXAMPLE 2

For the purpose of comparison, the above procedure was repeated with the elimination of the urea treatment. 500 cc of cod liver oil were treated with lipase and the non-saponifiable material removed, the aqueous phase then being acidified to salt out an organic phase which was then recovered, all in the same manner described above in Example 1. This organic phase containing free fatty acids was then dissolved in acetone in order to achieve a 10% solution. The temperature of the solution was gradually reduced by placing the solution in a commercial freezer. At about +20° C. precipitation began to take place. The precipitation occurred continuously until the temperature dropped to about −15° C. The precipitate was removed by filtration and was found to be a mixture of fatty acids. After continued cooling of the filtrate, no further precipitation occurred through −70° C. Even after the evaporation of the acetone no residue was left. Thus, no resolution of the fatty acids was possible without first treating with urea.

Treating the precipitate with urea would produce substantially the same results as the initial urea treatment discussed in Example 1, and will not serve to resolve pure EPA or DHA. It will only separate saturated fatty acids and most of the mono-unsaturated fatty acids from the remainder of the unsaturated fatty acids.

EXAMPLE 3

The procedure of Example 1 was repeated substituting petroleum ether, cyclohexane, or methylene chloride for the acetone in the fractional crystallization procedure. Identical results were obtained with petroleum ether and with cyclohexane, as were obtained with acetone. The precipitation of EPA and DHA occurred at the same temperature as with the use of acetone. When methylene chloride was used as the solvent, substantially 100% pure DHA precipitated at −38° to −40° C. as in Example 1. However, the methylene chloride began to solidify before the EPA could precipitate, thus methylene chloride is not a preferred solvent.

EXAMPLE 4

Living salmon are killed at a temperature of 0°-4° C. The internal organs are removed and the meat is cut into slices. A 1:1 mixture of γ-tocopherol and ascorbyl palmitate is sprayed immediately all over the slices.

The antioxidant sprayed slices are then mixed in a blender for 1-2 minutes and the blended mixture transferred to a centrifuge operating at 7,000-10,000 rpm for 10-15 minutes. After centrifugation, the oil phase is separated and mixed in a 1:1 ratio with a 1% aqueous solution of hydrochloric acid. After mixing well, the phases are allowed to separate and the oily phase is removed by means of a separating funnel. The step of mixing with dilute hydrochloric acid is repeated several times in order to remove all methylamines and then the oil is washed with distilled water and separated therefrom several times in order to remove any remaining acid. Additional antioxidants in amounts of 0.02% of γ-tocopherol and 0.02% of ascorbyl palmitate by weight of the oil are then added.

The oil thus obtained is then treated in exactly the same manner as set forth with respect to cod liver oil in Example 1. As in Exmple 1, 100% all-cis EPA was obtained, as well as 100% all-cis DHA.

EXAMPLE 5

110 cc of fish oil are mixed with 80 cc of 95% ethanol and 20 cc water. Then, 23 g potassium hydroxide is added. The mixture is heated in a flask with continuous stirring under reflux. Nitrogen is bubbled through the solution. The oil is protected from oxidation by adding to both the organic and aqueous phases of the mixture trace amounts of ascorbic acid, ascorbyl palmitate, and gamma tocopherol. Hydrolysis is complete after 60 to 90 minutes of reflux. The mixture is cooled and poured into crushed ice, and 200 cc of water are added. The mixture is shaken with an organic solvent immiscible with water to wash off the unsaponified materials such as cholesterol, vitamin A, vitamin D, and hydrocarbons. After removal of the organic solvent in a separatory funnel, the aqueous phase is acidified with 120-140 ml of 4 molar sulfuric acid, or its equivalent. The mixture of free fatty acids is extracted with petroleum ether, separated, and dried with magnesium sulfate.

The petroleum ether is completely evaporated over vacuum, the free fatty acids are dissolved in 100 cc of ethanol, and 75 g urea in absolute ethanol are added. The mixture is stirred together, and cooled. Inclusion crystals of urea and saturated fatty acids appear. These are filtered and the supernatant is evaporated until new inclusion crystals appear. The supernatant is further cooled until more inclusion crystals are formed, and these crystals are filtered out. The remaining supernatant, which includes mostly polyunsaturated free fatty acids, is evaporated. The remains from the supernatant are dissolved in petroleum ether and 5% HCl and separated. The organic phase is then washed with water.

The free fatty acids are dissolved in petroluem ether in a ratio of fatty acids to petroleum ether of 1:10 and are cooled to −20° C. overnight. The next day the solution is filtered out and discarded. The filtrate is reduced to ⅓ of its original volume and again cooled to −20° C. New crystals, of mono-unsaturated fatty acids, appear, and these crystals are filtered out. The filtrate is then reduced to 1/9 of its original volume, and cooled overnight. Either a new phase or new crystals, consisting of di-unsaturated fatty acids, appear; the separate fatty acid liquid phase is removed by a separatory funnel and the crystals are filtered out and discarded. The fitrate is cooled again to −30° C., and no separate phase or crystals appear. The solvent is then evaporated, and the reamining liquid consists of EPA and DHA.

EXAMPLE 6

100 g of linseed oil are treated as in Example 5 to form a urea complex which precipitates out, and a solution of a mixture of polyunsaturated free fatty acids. Cooling and volume reduction steps are then conducted in the manner described in Example 5.

In the first volume reduction step, crystals of plamitic acid appear.

In the second volume reduction step, a separate phase of oleic acid liquid or crystals of oleic acid appear.

In the third volume reduction step a separate phase of cis-linoleic acid liquid or crystals of cis-lioleic acid appear.

The only fatty acid found in the filtrate after the third step is alpha-linolenic acid.

It will be obvious to those skilled in the art that various changes may be made without departing from the scope of the invention and the invention is not to be considered limited to what is described in the specification.

What is claimed is:

1. A method for separating a substantially pure mixture of (all-Z)-5,8,11,14,17-eicosapentaenoic acid (EPA) and (all-Z)-4,7,10,13,16,19-docosahexaenoic acid (DHA) from marine animal oil, using only reaction conditions sufficiently mild to avoid degradation of the EPA and DHA, consisting essentially of the steps of:
   (1) extracting a mixture of polyunsaturated free fatty acids, or methyl or ethyl esters thereof from the oil,
   (2) mixing said fatty acids or esters with urea and a polar organic solvent, the solvent being present in a quantity sufficient to dissolve the urea and the fatty acids or esters, and the urea being present in a quantity sufficient to form a coordination complex with all of the fatty acids or esters capable of being complexed by the urea;
   (3) removing the precipitate which forms after said mixing step and recovering the filtrate;
   (4) removing remaining solvent and urea from the filtrate to obtain pure fatty acids or esters;
   (5) forming a solution by dissolving the pure fatty acids or esters in an organic solvent;
   (6) gradually cooling the solution until a first precipitate forms and removing said first precipitate;
   (7) removing sufficient solvent from the filtrate remaining after the precipitate is removed to substantially reduce the volume and increase the concentration of the solution;
   (8) gradually cooling the solution until a second precipitate forms and removing said second precipitate;
   (9) removing sufficient solvent from the filtrate remaining after the second precipitate is removed to substantially reduce the volume and increase the concentration of the solution;
   (10) gradually cooling the filtrate until a separate liquid or solid phase forms and removing said separate phase; and
   (11) retaining the remaining liquid phase containing a mixture of substantially pure EPA and DHA.

2. A method in accordance with claim 1, wherein the organic solvent used in the dissolving step is selected from the group consisting of ethanol, methanol, acetone, cyclohexane, petroleum ether and methylene chloride.

3. A method in accordance with claim 1, wherein sufficient solvent is removed in said steps 7 and 9 such that the temperature to which the solution is cooled to obtain a precipitate in said steps 8 and 10 is substantially the same as the temperature to which the solution is cooled in said step 6.

4. A method in accordance with claim 3, wherein said temperature is about −10° to −30° C.

5. A method in accordance with claim 1, wherein in said steps 7 and 9 the volume of the solution from which the solvent is being removed in each said step is reduced by a factor of about 2-9.

6. A method in accordance with claim 5, wherein the volume of the solution in steps 7 and 9 is reduced by a factor of about 3.

7. A method in accordance with claim 1, wherein said step (1) comprises the steps of:
   (a) hydrolyzing marine animal oil under conditions sufficiently mild to avoid peroxidation and cis-trans conversion;
   (b) removing non-saponifiable materials from the hydrolyzation product by washing with an organic solvent and recovering the aqueous phase; and
   (c) acidifying the recovered aqueous phase to release an organic phase and recovering the organic phase containing pure fatty acids or esters.

8. A method in accordance with claim 7, wherein the oil is protected from oxidation by adding a member selected from the group consisting of ascorbic acid, ascorbyl palmitate, gamma tocopherol and a mixture thereof prior to said hydrolyzing step.

9. A method in accordance with claim 7, wherein nitrogen is bubbled through the oil during said hydrolyzing step.

10. A method in accordance with claim 1, wherein the polar organic solvent used in the step of mixing with urea is selected from the group consisting of methanol, ethanol, isopropanol, petroleum ether, benzene, trichloroethylene, and methylisobutylketone 11. A method in accordance with claim 1, wherein the polar organic solvent used in the step of mixing with urea is ethanol.

12. A method in accordance with claim 1, wherein the step of mixing with urea takes place at a temperature sufficient to cause dissolution of the urea and the fatty acids or esters in the organic solvent used, and further including a step of cooling the mixture after the step of mixing with urea, in order to effect precipitation.

13. A method in accordance with claim 1, wherein said step of extracting a mixture of polyunsaturated free fatty acids from the oil includes a step of hydrolyzing triglycerides in the oil with lipase or a strong base.

14. A method in accordance with claim 13, wherein said hydrolyzing step comprises hydrolyzing for a time sufficient only to permit the hydrolyzing agent to detach a substantial amount of the first and third branches of the triglycerides being hydrolyzed, leaving the middle branch substantially intact on the glyceride backbone.

15. A method in accordance with claim 1, wherein said step (1) includes the steps of hydrolyzing the triglycerides in the oil by transesterification with ethanol or methanol.

16. A method in accordance with claim 15, wherein said transesterification step comprises refluxing the oil with anhydrous ethanol or methanol in the presence of a trace amount of sodium metal, sodium ethoxide or sodium methoxide.

17. A method for separating substantially pure (all-Z)-5,8,11,14,17-eicosapentaenoic acid (EPA) from marine animal oil, using only reaction conditions sufficiently mild to avoid degradation of the EPA, consisting essentially of the steps of:
(1) extracting a mixture of polyunsaturated free fatty acids, or methyl or ethyl esters thereof, from the oil;
(2) mixing said fatty acids or esters with urea and a polar organic solvent, the solvent being present in a quantity sufficient to dissolve the urea and the fatty acids or esters, and the urea being present in a quantity sufficient to form a corrdination complex with all of the fatty acids or esters capable of being complexed by the urea;
(3) removing the precipitate which forms after said mixing step and recovering the filtrate;
(4) removing remaining solvent and urea from the filtrate to obtain pure fatty acids or esters;
(5) forming a solution by dissolving the pure fatty acids or esters in an organic solvent which remains in the liquid state below the temperature at which EPA prcipitates therefrom;
(6) gradually cooling and removing any new solid or liquid phases which separate from the solution during the cooling process; and
(7) retaining the phase containing substantially pure EPA.

18. A method in accordance with claim 17, wherein said step (1) comprises the steps of:
(a) hydrolyzing marine animal oil under conditions sufficiently mild to avoid peroxidation and cis-trans conversion;
(b) removing non-saponifiable materials from the hydrolyzation product by washing with an organic solvent and recovering the aqueous phase; and
(c) acidifying the recovered aqueous phase to release an organic phase and recovering the organic phase containing pure fatty acids or esters.

19. A method in accordance with claim 18, wherein sadi hydrolyzing step comprises subjecting the marine animal oil to enzymatic hydrolysis in the presence of lipase.

20. A method in accordance with claim 19, wherein said lipase is activated by traces of cysteine or ascorbic acid and the hydrolysis takes place at a temperature of 35°–40° C. and a pH of 6–7.

21. A method in accordance with claim 17, wherein said step of mixing with urea takes place at a temperature sufficient to cause dissolution of the urea and the fatty acids in the organic solvent used, and further including the step of cooling the mixture after said step of mixing with urea, in order to effect precipitation.

22. A method in accordance with claim 17, wherein the polar organic solvent used in said step of mixing with urea is selected from the group consisting of methanol, ethanol, isopropanol, petroleum ether, benzene, trichloroethylene and methylisobutyl ketone.

23. A method in accordance with claim 22, wherein said solvent used in said step of mixing with urea is ethanol.

24. A method in accordance with claim 17, wherein said organic solvent used in said dissolving step is acetone, cyclohexane, petroleum ether or methylene chloride.

25. A method for separating substantially pure EPA from marine animal oil in accordance with claim 17, and further for additionally separating substantially pure (all-Z)-4,7,10,13,16,19-docosahexaenoic acid (DHA) therefrom, further including, after said gradually cooling and removing step, the step of retaining the phase containing substantially pure DHA.

26. A method for separating substantially pure (all-Z)-4,7,10,13,16,19-docosahexaenoic acid (DHA) from marine animal oil, using only reaction conditions sufficiently mild to avoid degradation of the DHA, consisting essentially of the steps of:
(1) extracting a mixture of polyunsaturated free fatty acids, or methyl or ethyl esters thereof, from the oil;
(2) mixing said fatty acids or esters with urea and a polar organic solvent, the solvent being present in a quantity sufficient to dissolve the urea and the fatty acids or esters, and the urea being present in a quantity sufficient to form a coordiantion complex with all of the fatty acids or esters capable of being complexed by the urea;
(3) removing the precipitate which forms after said mixing step and recovering the filtrate;
(4) removing remaining solvent and urea from the filtrate to obtain pure fatty acids or esters;
(5) forming a solution by dissolving the pure fatty acids or esters in an organic solvent which remains in the liquid state below the temperature at which DHA precipitates therefrom;
(6) gradually cooling and removing any new solid or liquid phases which separate from the solution during the cooling process; and
(7) retaining the phase containing substantially pure DNA.

27. A method in accordance with claim 26, wherein said step (1) comprises the steps of:
(a) hydrolyzing marine animal oil under conditions sufficiently mild to avoid peroxidation and cis-trans conversion;
(b) removing non-saponifiable materials from the hydrolyzation product by washing with an organic solvent and recovering the aqueous phase; and
(c) acidifying the recovered aqueous phase to release an organic phase and recovering the organic phase containing pure fatty acids or esters.

28. A method in accordance with claim 27, wherein said hydrolyzing step comprises subjecting the marine animal oil to enzymatic hydrolysis in the presence of lipase.

29. A method in accordance with claim 28, wherein said lipase is activated by traces of cysteine or ascorbic acid and the hydrolysis takes place at a temperature of 35°–40° C. and pH of 6–7.

30. A method in accordance with claim 26, wherein said step of mixing with urea takes place at a temperature sufficient to cause dissolution of the urea and the fatty acids in the organic solvent used, and further including the step of cooling the mixture after said step of mixing with urea, in order to effect precipitation.

31. A method in accordance with claim 26, wherein the polar organic solvent used in said step of mixing with urea is selected from the group consisting of methanol, ethanol, isopropanol, petroleum ether, benzene, trichloro ethylene and methylisobutyl ketone.

32. A method in accordance with claim 31, wherein said solvent used in said step of mixing with urea is ethanol.

33. A method in accordance with claim 26, wherein said organic solvent used in said dissolving step is acetone, cyclohexane or petroleum ether.

* * * * *